United States Patent Office 3,455,870
Patented July 15, 1969

3,455,870
FREE-FLOWING MOLDING POWDER
Norman T. Hebert, Bay City, Mich., assignor to The Dow Chemical Company, Midland, Mich., a corporation of Delaware
No Drawing. Continuation of application Ser. No. 218,820, Aug. 23, 1962. This application June 13, 1968, Ser. No. 736,559
Int. Cl. C08f 1/84, 45/06, 21/02
U.S. Cl. 260—40                                7 Claims

ABSTRACT OF THE DISCLOSURE

Free-flowing molding powders are prepared using a granular resin and a free-flowing powdered filler having absorbed therein a sufficient quantity of a monomer to react with the powdered resin to form a thermoset article.

---

This application is a continuing application of my copending application Ser. No. 218,820, filed Aug. 23, 1962, and now abandoned.

This invention relates to an improved process for the preparation of granular molding materials, and more particularly relates to the preparation of molding materials utilizing fillers.

Many molding compositions are prepared by mixing a hard brittle resin such as the alkyds or epoxy resins with a polymerizable monomer and a filler material. This mixing is usually accomplished by combining the monomeric material with the resin to form a liquid mixture either by virtue of the solvent action of the monomer or by the solvent action in combination with externally applied heat. Subsequently, the filler material is added to the liquid resinous mass by stirring or milling to form a pasty, viscous mixture often referred to as "gunk." The pasty mass or gunk may then be transferred to a compression molding apparatus, compressed and formed into a desired configuration and cured by means of heat to a final molded object. Alternately, the viscous pasty mass may be cooled and subdivided into a granular composition which may be later molded into a desired configuration. Generally, for the preparation of heavy viscous molding compositions relatively expensive equipment must be utilized which is capable of handling and chilling viscous masses.

It is an object of the present invention to provide a method of preparing granular molding compositions which are thermosetting.

It is a further object of this invention to provide granular molding compositions incorporating a filler.

It is another object of this invention to provide a method of preparing granular resinous thermoplastic molding compositions containing a filler which does not require heavy mixing equipment.

These benefits and other advantages in accordance with the invention are achieved by incorporating in a filler material a monomer capable of polymerization with a resinous material that is granular under normal shipping conditions, only sufficient monomer being incorporated within said filler to maintain the filler-monomer mixture in a dry condition, admixing said dry granular resin with said dry filler-monomer mixture in a proportion sufficient to result in a dry molding composition.

The present invention may be applied to many resinous molding systems, typically polyesters, epoxy resins, melamines, B-stage phenolic resins and the like. Materials of these classes having the common physical properties of being brittle, thermoplastic and copolymerizable with a monomeric material are usable in the practice of the invention. Particularly advantageous are the resins which are friable and exist under normal conditions, i.e., below about 100° F. as solids. Generally, in the practice of the invention, the resins are ground to a suitable size, typically those passing through a 50 mesh U.S. Standard Sieve and retained on a 300 mesh U.S. Standard Sieve size are customarily employed. However, resins having physical sizes both larger and smaller are readily utilized.

The present invention is of particular advantage when employed with synthetic linear polyester resins which are prepared by reacting terephthalic acid and dialkly terephthalic acids, isophthalic acid or ester-forming derivatives thereof, with a glycol of the series $HO(CH_2)_nOH$, where $n$ is a whole number within the range of 2–10 and having reactive olefinic linkages within the polymer molecule. Such polyesters also may include copolymerized therein up to 20 percent by weight of a second acid or ester thereof having reactive olefinic unsaturation such as fumaric acid, maleic acid, itaconic acid, tetrahydrophthalic acid and the like. Polyesters containing olefinic unsaturation are readily reacted with monomeric olefinic materials such as the alkenyl aromatic monomers of the general formula

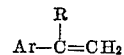

wherein Ar represents an aromatic hydrocarbon radical, or aromatic halohydrocarbon radical of the benzene series, and R is hydrogen or the methyl radical. Examples of alkenyl aromatic monomers are styrene, α-methylstyrene, o-methylstyrene, m-methylstyrene, p-methylstyrene, ar-ethylstyrene, ar-vinylxylene, ar-chlorostyrene and ar-bromostyrene; beneficially, if desired, other olefinically unsaturated polymerizable monomeric materials may be utilized such as acrylates and methacrylates, acrylonitrile, divinylbenzene, vinyl acetate, vinyl butyrate and the like.

Fillers employed in the practice of the invention are usually inorganic, highly absorbent materials such as diatomaceous earth, clays and the like. Such fillers are well known in the art. Also, fibrous cellulosic material such as short cotton linters are also beneficially employed. There are two critical properties which the filler must have: (a) high capacity to absorb monomeric material, and (b) the fillers must not prevent polymerization or copolymerization of the monomer with the resin under the curing conditions.

Generally, in the preparation of molding powders in accordance with the invention, the polyester, alkyd or other resinous material is ground to a desirable and suitable size for the particular molding application. A predetermined quantity of filler material is agitated in a mixer such as a ribbon blender and the liquid polymerizable monomer is added with agitation until it is substantially uniformly distributed throughout the filler and a dry, and in many cases beneficially, a free-flowing powder results. The monomer-impregnated filler is then blended with the ground resin to give a dry free-flowing molding powder capable of polymerization under heat and pressure. Beneficially, in certain instances, a catalyst may be added to the monomer prior to absorption of the monomer by the filler. Pigments, dyes and other additives are optionally included in the blending operation of the resin with the impregnated filler and in the blending of the monomer with the filler. Usually, it is desirable for most commercially purposes to utilize as much filler as will be bonded by the resinous composition and subsequently adequate absorbent is readily available to maintain the liquid monomer within the system and yet have a dry free-flowing powder. Typically, such absorbents as diatomaceous earth readily absorb about 50 percent of their weight of an unsaturated polymerizable monomeric material such as styrene and the like and remain in dry free-flowing condition.

In certain instances, such as the preparation of styrene-polyester molding compositions, pH of the clay, as determined by measuring the pH of a 10 percent by weight slurry in water, should be neutral or on the basic side; that is, pH should be above about 6. Otherwise, under the heat and pressure of normal molding conditions the resin and composition does not cure readily.

Compositions in accordance with the invention may be molded under a wide variety of conditions dependent on the particular materials employed. However, generally the pressures and temperatures utilized are similar to those utilized in conventional "gunk" molding operations and pressures from about 20 to about 5000 pounds per square inch gauge will be utilized depending on the product desired. Beneficially for most operations, however, pressures from about 200 to about 3000 pounds per square inch are effective.

Fillers, dyes, pigments, stabilizers and like additaments which are oftentimes desirable in a resin composition are readily added by admixture with the powdered composition. Generally, it is beneficial that such additaments be added only after the liquid monomer is absorbed by the inert filler; however, in some instances, they may be added to the finely divided resin, the monomer or filler prior to admixture.

Although generally a free-flowing powder is desired as the final product, in certain instances this feature is not entirely necessary and a composition which has a slight tendency to clump is satisfactory.

The invention is further illustrated, but not limited by the following examples.

EXAMPLE I

A resin kettle is charged with 1.98 gram moles of propylene glycol, 0.9 gram mole of isophthalic acid, 0.9 gram mole of fumaric acid, and 0.2 part by weight, based on the sum of the weights of the glycol and acid constituents, of triphenylphosphite. These components are thoroughly mixed at a temperature of about 25° C. and heated to a temperature of about 215° C. for a period of about 10 hours. The reaction product has an acid number of 28 (the acid number being the number of milligrams of potassium hydroxide to neutralize the acid in 1 gram of resin of the reaction mixture). The contents of the resin kettle, while hot, are poured onto a flat surface and cooled to about 30° C. The product is a brittle, friable resinous solid and is ground. The portion of the product passing a 100 mesh screen and retained on a 300 mesh screen is retained. Screen sizes are U.S. Standard Sieve Size. A mixture of 12.5 parts of styrene monomer containing 600 parts per million based on the weight of the monomer of tertiary butyl catechol are slowly added, with agitation, to 25 parts of diatomaceous earth commercially available under the trade designation of Micro-Cel T-38. The resultant mixture is a free-flowing powder. A charge of 0.63 gram of dicumyl peroxide catalyst (1½ percent based on monomer and polyester) commercially available under the trade designation of Di-cup 40C is admixed with the styrene-diatomaceous earth mixture. Di-cup 40C is about 40 parts of dicumyl peroxide supported on about 100 parts of finely ground calcium carbonate. About 38 parts of the catalyst-monomer-diatomaceous earth mixture and 29.2 parts of the ground polyester resin is thoroughly admixed to form a free-flowing molding powder. The resulting free-flowing powder is compression molded at a temperature of 150° C. for about 15 minutes under a pressure of 2550 pounds per square inch. A uniform hard molding without voids is obtained. A portion of the granular molding composition hereinbefore prepared is stored under normal storage conditions; i.e., between 70–80° F. for a period of about 6 months and subsequently remolded to give a hard, high density molding which is substantially identical with the freshly prepared molding composition.

EXAMPLE II

The procedure of Example I is repeated employing a diatomaceous earth available under the trade designation of Micro-Cel A. Similar results are obtained.

EXAMPLE III

The procedure of Example I is repeated employing a diatomaceous earth available under the trade designation of Micro-Cel T–26. Similar results are obtained.

EXAMPLE IV

The procedure of Example I is repeated employing a diatomaceous earth available under the trade designation of Micro-Cel C. Similar results are obtained.

EXAMPLE V

The procedure of Example I is repeated employing a diatomaceous earth available under the trade designation of Micro-Cel E. Similar results are obtained.

EXAMPLE VI

The procedure of Example I is followed with the exception that a Georgia kaolin, available under the trade designation of Celkate T–21, is employed. Similar beneficial results are obtained.

EXAMPLE VII

Example VI is repeated with the exception that a Georgia kaolin bearing the trade designation of Hydrite 10–S is utilized and commensurate results obtained.

EXAMPLE VIII

The procedure of Examples I–VII are repeated wherein vinyl toluene is used to replace styrene and results commensurate with those obtained in Example I are obtained.

EXAMPLE IX

The procedure of Example VIII is repeated with the exception that parachlorostyrene is utilized. The results are commensurate with those obtained in Example VI.

EXAMPLE X

The procedure of Example VIII is followed utilizing diallyl phthalate instead of vinyl toluene. Commensurate results are obtained.

EXAMPLE XI

Thirty-five parts of a polyester prepared in accordance with Example I are blended with a free-flowing powder prepared by admixing 25 parts of styrene containing 600 parts per million of tertiary butyl catechol, based on the weight of the styrene, with 50 parts of Micro-Cel A to form a free-flowing powder. The monomer absorbent mixture is blended with the finely ground polyester resin to give a free-flowing molding powder which is cured at 150° C. for about 10 minutes under a pressure of about 2500 pounds per square inch to give a solid, firm molding having uniform density throughout.

EXAMPLE XII

The procedure of Example XI is followed with the exception that 50 parts of the Micro-Cel A and 3 parts of styrene are employed. A free-flowing molding powder which is molded into a hard, uniform density product is obtained.

The foregoing compositions prepared in Examples I–XII, on standing, are found to have excellent shelf stability. Some samples standing at about 25° C. for a period of about one year are found to be modable and have properties generally commensurate with that of the freshly mixed composition. No tendency is observed for the mixtures to stratify or for the monomeric material to separate from the substantially dry powder.

The molding powders of the invention are particularly useful for the preparation of such articles as boxes, cups and similar containers, as well as for electrical insulators, knobs, handles and the like, wherein the hardness, strength, as well as the ability to provide a high gloss surface, are desired characteristics.

Generally, the preferred operation utilizes from about 65 parts to 70 parts of absorbent with 35 to 30 parts of styrene and like alkenyl aromatic monomers when admixed with polyester resins. Generally, for most siliceous fillers, over 35 parts of the alkenyl aromatic monomers, such as styrene, will result in a semifree-flowing powder which contains minor lumps and less than about 30 parts of the alkenyl aromatic monomers result in a composition having poorer physical properties than are obtainable in the preferred range. However, where such strength is not necessary, beneficially the monomer content may be reduced to provide an article with less than the maximum physical properties.

In a manner similar to the foregoing examples, other resinous compositions are readily prepared wherein reactive liquid components are incorporated into epoxy resin compositions, melamine resin compositions, phenolic resin compositions and the like to provide a heat curable granular free-flowing material which is readily molded into shaped articles having excellent physical properties and uniform structure.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A molding mixture consisting essentially of a granular reactive thermoplastic resinous polyester resin, the polyester resin being a synthetic linear polyester resin prepared by reacting a member selected from the group consisting of terephthalic acid, dialkyl terephthalic acids, isophthalic acid or ester-forming derivatives thereof, with a glycol of series $HO(CH_2)_nOH$, wherein $n$ is a whole number within the range of 2–10 and having reactive olefinic linkages within the polymer molecule including such polyesters which have copolymerized therein up to 20 percent by weight of a member selected from the group consisting of fumaric acid, maleic acid, itaconic acid, tetrahydrophthalic acid and mixtures thereof, said polyesters containing olefinic unsaturation, said polyester resin being in intimate admixture with an inorganic highly absorbent free-flowing particulate filler selected from the group consisting of diatomaceous earth and clay and mixtures thereof wherein the pH of a 10 percent by weight slurry of the filler in water has a pH greater than 6, said absorbent filler having absorbed therein an alkenyl aromatic monomer of the general formula

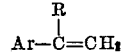

wherein Ar represents a member selected from the group consisting of aromatic hydrocarbon radicals, aromatic halohydrocarbon radicals of the benzene series, and R is selected from the group consisting of hydrogen, said molding mixture being in a dry, free-flowing condition and being moldable to a solid body, the polyester resin and the monomer being present in the mixture in proportion such that on molding under heat and pressure a solid thermoset composition is obtained.

2. The mixture of claim 1 wherein the monomeric material is styrene.

3. The mixture of claim 1 wherein the filler is clay.

4. The mixture of claim 1 wherein the filler is diatomaceous earth.

5. The mixture of claim 1 wherein a catalyst to promote the copolymerization of the monomer and the resin containing olefinic unsaturation is absorbed in said filler.

6. The mixture of claim 5 wherein said catalyst is a peroxide.

7. The mixture of claim 6 wherein said catalyst comprises dicumyl peroxide.

References Cited

UNITED STATES PATENTS

| | | | |
|---|---|---|---|
| 2,819,243 | 1/1958 | Baker | 260—40 |
| 2,780,611 | 2/1957 | De Grotenhuis | 260—40 |
| 2,801,226 | 7/1957 | Wohnisiedler | 260—40 |
| 2,999,834 | 9/1961 | Wismer et al. | 260—40 |
| 3,236,802 | 2/1966 | Ferringo | 260—40 |
| 3,032,431 | 5/1962 | Ferringo | 260—40 |
| 2,801,229 | 7/1957 | De Hoff | 260—40 |
| 3,041,303 | 7/1962 | Nelson | 260—41.5 |
| 2,773,048 | 12/1956 | Formo | 260—37 |

MORRIS LIEBMAN, Primary Examiner

L. T. JACOBS, Assistant Examiner

U.S. Cl. X.R.

260—873